C. GORMANN & J. B. THIEL.
Vehicles.
No. 145,413.  Patented Dec. 9, 1873.
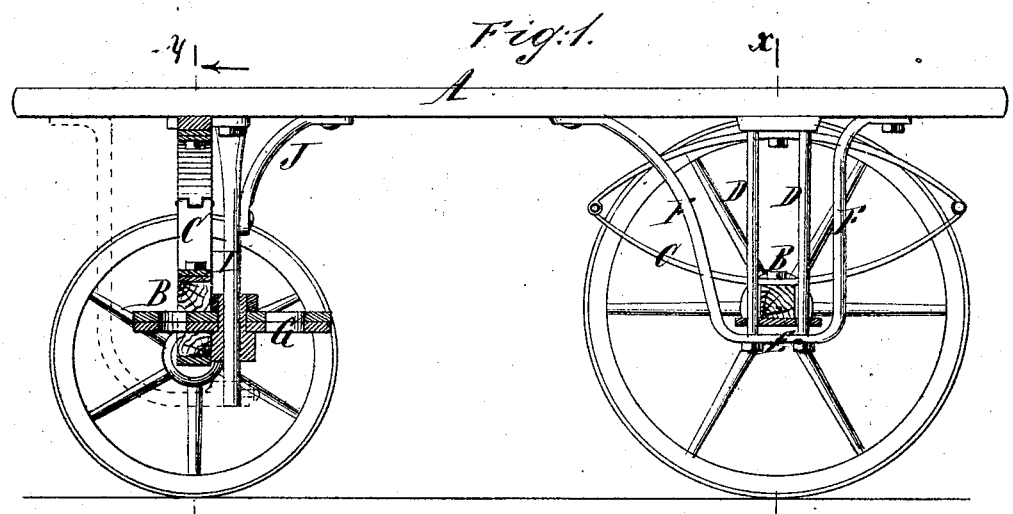
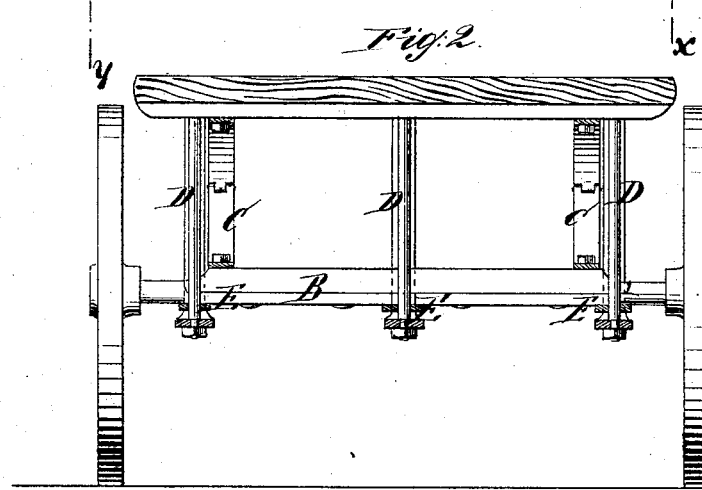
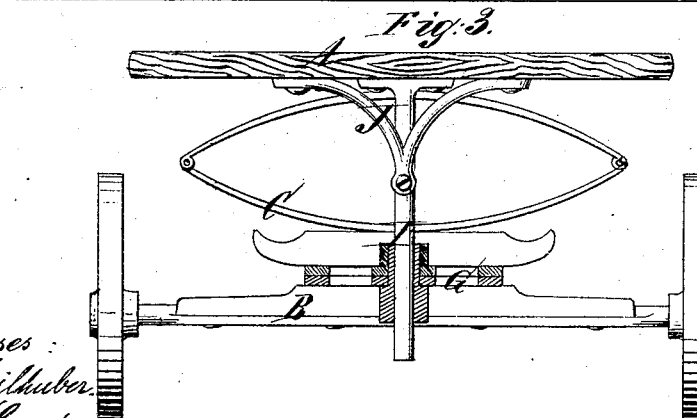

UNITED STATES PATENT OFFICE.

CHRISTIAN GORMANN AND JOSEPH B. THIEL, OF UNION HILL, NEW JERSEY.

IMPROVEMENT IN VEHICLES.

Specification forming part of Letters Patent No. 145,413, dated December 9, 1873; application filed October 30, 1873.

*To all whom it may concern:*

Be it known that we, CHRISTIAN GORMANN and JOSEPH B. THIEL, both of Union Hill, in the county of Hudson and State of New Jersey, have invented a new and useful Improvement in Wagons; and we do hereby declare the following to be a full, clear, and exact description thereof, which will enable those skilled in the art to make and use the same, reference being had to the accompanying drawing forming part of this specification, in which drawing—

Figure 1 represents a longitudinal vertical section of our wagon. Fig. 2 is a transverse section thereof in the plane $x\ x$, Fig. 1. Fig. 3 is a similar section in the plane $y\ y$, looking in the direction of the arrow marked opposite to that line.

Similar letters indicate corresponding parts.

This invention relates to certain improvements in carriages, wagons, &c.; and consists in the arrangement of a sliding king-bolt, which is held by stays to the body of the wagon, and which is encircled by a horizontal steering-wheel connected with the front axle, in such a manner that the bolt forms a brace for the front part of the wagon.

In the drawing, the letter A designates the bottom or body of a wagon, and B B' are its front and rear axles. C are springs, which are supported on said axles B B', and said springs in turn support the body A, forming front and rear beds for the wagon.

In this example the springs are arranged in the usual manner, one on the front and two springs on the rear part of the wagon. In light wagons, however, the rear need also have but one spring, which is then arranged crosswise, or similar to the spring in front. The front and rear axles of the wagon are made independent of each other, requiring no perch or reach, whereby a great impediment in steering is removed.

The letter D designates rods, which are arranged in pairs, and extend downward from the wagon-body A, and slide in guide-plates E, secured to the rear axle. The lower ends of the rods D are held on the wagon-body by stays or brackets F, which are applied crosswise to the axle, either fore and aft or only on one part thereof, as most convenient. Said brace-rods and their stays are affixed on opposite sides of the wagon, and so that the rods come alongside of the rear axle, and in heavy wagons also in the middle thereof, as shown in Fig. 2 of the drawing, greater stability being thereby imparted to the wagon.

By arranging the series of rods D one on each side of the axle, and passing the same through openings in the plate E connected with the axle, the body of the wagon is free to partake of the motion of the springs, and at the same time the body of the wagon is steadied and kept in a horizontal position, and lateral strain on the springs avoided; and, further, by arranging the rods D so as to pass along the side of the axle, the strength of the same is not deteriorated, as would be the case if the axle were perforated for the passage of the rods.

The letter G designates a horizontal steering-wheel, which is made in two parts, moving on each other, the stationary part being secured to the wagon bed or bolster, and the rotating part to the front axle. Said steering-wheel G, and with it the front axle, turns on a bolt or spindle, I, commonly called the "king-bolt," which is held, similar to the rods D, by stays J, to the wagon-body A. The bolt I is made of such strength that it requires only an after-stay; but, if desired, a front stay can be added, as shown in dotted outline in Fig. 1. The two parts of the steering-wheel G are united by a hollow screw or bolt, K, which is put through the center of said wheel, being retained by a nut, L. The square head of said hollow bolt K comes against the side of the front axle, and is thereby locked in position.

Our invention is applicable to all kinds of wheel carriages or wagons, and imparts great strength and durability, while it materially reduces the cost of the wagon.

What we claim as new, and desire to secure by Letters Patent, is—

1. The sliding king-bolt I, connected with the body of the wagon by stays J, in combination with a horizontal steering-wheel, G, connected with the front axle, substantially as described, for the purpose specified.

2. The combination of the guide-plates E, having openings on each side of the axle, with the sliding brace-rods D, arranged in pairs on each side of the axle, all constructed substantially as and for the purpose specified.

CHRIST. GORMANN.
J. BERNARD THIEL.

Witnesses:
D. A. KEPHOR,
CHAS. WAHLERS.